United States Patent
Erdtmann

(10) Patent No.: US 9,371,628 B2
(45) Date of Patent: Jun. 21, 2016

(54) CONTROL STATION FOR A ROAD PAVER WITH A STEP DEVICE WITH AUTOMATED LOCKING

(71) Applicant: JOSEPH VOEGELE AG, Ludwigshafen/Rhein (DE)

(72) Inventor: Bernhard Erdtmann, Mannheim (DE)

(73) Assignee: JOSEPH VOEGELE AG (DE)

(*) Notice: Subject to any disclaimer, the term of this patent is extended or adjusted under 35 U.S.C. 154(b) by 0 days.

(21) Appl. No.: 14/805,857

(22) Filed: Jul. 22, 2015

(65) Prior Publication Data

US 2016/0076221 A1    Mar. 17, 2016

(30) Foreign Application Priority Data

Sep. 17, 2014    (EP) .................................... 14185175

(51) Int. Cl.
| | |
|---|---|
| *E01C 19/22* | (2006.01) |
| *E02F 9/16* | (2006.01) |
| *E01C 19/48* | (2006.01) |
| *E01C 19/40* | (2006.01) |
| *B62D 51/02* | (2006.01) |

(52) U.S. Cl.
CPC ............... *E02F 9/166* (2013.01); *B62D 51/02* (2013.01); *E01C 19/405* (2013.01); *E01C 19/48* (2013.01)

(58) Field of Classification Search
CPC ........ E01C 19/48; E01C 19/405; E02F 9/166; B62D 51/02
USPC .......................................................... 404/118
See application file for complete search history.

(56) References Cited

U.S. PATENT DOCUMENTS

| | | | | |
|---|---|---|---|---|
| 2,951,426 A | * | 9/1960 | Pollitz ................. | E01C 19/4853 404/108 |
| 3,286,606 A | * | 11/1966 | Layton .................... | E01C 19/42 126/271.2 R |
| 3,482,494 A | * | 12/1969 | Jennings Jr. ........ | E01C 19/4873 404/110 |
| 3,557,672 A | * | 1/1971 | Shurtz ................. | E01C 19/4873 404/118 |

(Continued)

FOREIGN PATENT DOCUMENTS

| | | |
|---|---|---|
| DE | 20001798 U1 | 3/2000 |
| EP | 0939165 A2 | 9/1999 |

(Continued)

OTHER PUBLICATIONS

Extended European Search Report Dated Mar. 5, 2015, Application No. 14185175.8-1604, Applicant Joseph Voegele AG, 6 Pages.

(Continued)

*Primary Examiner* — Raymond W Addie
(74) *Attorney, Agent, or Firm* — Brooks Kushman P.C.

(57) ABSTRACT

A control station for a road paver with a step device for providing a standing area for a person comprises a support part that is adapted to be firmly linked to a chassis or a paving screed of the road paver, and a step part with a step surface. The step part is attached to the support part such that the step part is tiltable about a main tilt axis between a transport position and an operating position, wherein the step surface is aligned generally horizontally in the operating position so that the standing area for the person is provided. The control station further includes a locking unit with an engagement element configured to engage the step part when the step part is in the operating position to secure the position of the step part, wherein the engagement element is pre-loaded for a movement into engagement with the step part.

20 Claims, 5 Drawing Sheets

(56) References Cited

U.S. PATENT DOCUMENTS

| | | | | |
|---|---|---|---|---|
| 4,496,265 A * | 1/1985 | Fragale | ............. | E01C 19/182 404/110 |
| 7,413,377 B2 * | 8/2008 | Pontano, III | ............ | E01C 19/48 404/101 |
| 8,807,866 B2 | 8/2014 | Buschmann et al. | | |
| 8,864,410 B1 * | 10/2014 | Kopacz | ............ | E01C 19/48 404/118 |

FOREIGN PATENT DOCUMENTS

| | | |
|---|---|---|
| EP | 2366832 A1 | 9/2011 |
| JP | 343046 U | 4/1991 |
| JP | 2009287351 A | 12/2009 |
| JP | 2014025297 A | 2/2014 |

OTHER PUBLICATIONS

Japanese Office Action Dated Dec. 22, 2015, Application No. 2015-146510, 3 Pages.

* cited by examiner

CONTROL STATION FOR A ROAD PAVER WITH A STEP DEVICE WITH AUTOMATED LOCKING

CROSS-REFERENCE TO RELATED APPLICATIONS

This application claims foreign priority benefits under 35 U.S.C. § 119(a)-(d) to European patent application number EP 14185175.8, filed Sep. 17, 2014, which is incorporated by reference in its entirety.

TECHNICAL FIELD

The disclosure concerns a control station for a road paver with a step device for providing a standing area for a person.

BACKGROUND

Typically, a paving screed is suspended on traction bars and drawn in travel direction behind a road paver to densify and to straighten the fresh road surface. Paving screeds usually have a compressor bar (tamper bar) with an adjustable vibration frequency and an adjustable stroke. In addition, a screed plate can be installed on a paving screed in order to finally straighten the fresh road surface, for example a bituminous mixture. The character and quality of a built-in road surface thereby depends on a series of paving parameters such as, for example, the paving speed, the tamper frequency, the tamper stroke and the setting angle of the paving screed.

To achieve the desired paving quality, these and other parameters of a road paver can be adapted during the paving process by means of appropriate adjustment units. It is advantageous in this process if an operating person has a view as good as possible on the road surface already installed and preferably also on the working process of the paving screed.

This can be achieved, for instance, by a control station with adjustment units to be installed above or behind the paving screed of the road paver so that an operating person on the control station will be able to oversee the current status of the work. Such an arrangement requires the provision of a suitable workspace, in particular a standing area, for an operating person on the control station.

From EP 2 366 832 A1, a paving screed for a road paver with an external control stand is known, wherein a horizontal step area is installed on the side of the paving screed, which is situated at the rear in the direction of travel of the road paver, on which a person can stand during operation of the adjustment units without coming in contact with the fresh paving material.

Such a step area enables an operating person during the working process to operate adjustment units installed on a paving screed without problems and to oversee the current paving status, but can turn out to be bothersome during transportation of the paving screed.

For this reason, it can be advantageous if the step area is tiltable between a horizontal operating position and a vertical transport position. For that, the step area can be tilted upwards from the horizontal position towards the paving screed if it is currently not needed.

Although this tiltability eliminates a few disadvantages of the step area with regard to the transportability of the paving screed of the road paver, it makes the standing area for the operating person more unstable.

SUMMARY

It is an object of the disclosure to improve a control station for a road paver with a step device with regard to transportability and workplace safety.

This object is achieved by a control station for a road paver. The dependent claims describe advantageous embodiments of the disclosure.

The control station for a road paver according to the disclosure has a step device to provide a standing area for a person.

Preferably, control elements, such as an adjustment unit for one or several working parameters of the screed (e.g., tamper stroke, setting angle, tamper frequency) and/or other parameters of the road paver (e.g., paving speed) are provided at the control station, so that they can be operated by an operating person standing on the step device.

According to the disclosure, the step device has a support part that is adapted to be firmly linked to the chassis or the paving screed of a road paver. In particular, this can be a beam that extends in a vertical direction. The link with the chassis or the paving screed can be ensured, for example, by a screwed joint or through welding. Preferably, the support part is adapted to be installed at a rear end of the chassis or of the paving screed.

At least one control element for working parameters of the road paver and/or the paving screed can be provided or installed at the support part. Preferably, the whole operation of the road paver can be controlled by means of the at least one control element.

A step part with a step surface is attached to the support part in a way as to be tiltable around a main tilting axis. Thereby, the step part is adapted to be tilted between an operating position and a transport position, wherein in the operating position, the step surface is essentially aligned horizontally so that an operating person can stand on it. In particular, in the operating position, the step surface can be parallel to a horizontal plane or be tilted by a maximum of 2°, of 5°, of 8°, of 10° or of 20° with respect to a horizontal plane.

To increase workplace safety, a locking unit with an engagement element is provided. According to the disclosure, the engagement element is configured to come into engagement with the step part when the step part is in the operating position, thereby securing the position of the step part. By the engagement, tilting of the step part out of the operating position, in particular at least partial tilting of the step part from the operating position into the transport position, is prevented. If a road paver with the control station according to the disclosure collides backwardly with an obstacle, the step part cannot tilt and the operating person cannot get stuck.

According to the disclosure, the engagement element of the locking unit is pre-loaded and/or biased for a movement towards the engagement with the step part. Due to the pre-load, the engagement element can automatically, i.e., without intervention by a user, come into engagement with the step part when the step part reaches the operating position at the end of a tilting movement from the transport position to the operating position.

Through the pre-load of the engagement element, a working process to manually secure the step part in the operating position can be eliminated. Therefore, workplace safety is further improved as the securization of the step part cannot be forgotten by accident.

The locking unit is preferably attached to the support part. In particular, the locking unit can be attached to the support part in a way that it can only be removed from it by means of an appropriate tool. As a result, the locking unit cannot be lost.

Preferably, the step surface is generally aligned in a vertical direction in the transport position. For example, in the transport position, the step surface can be situated in parallel to an area of the paving screed that is located on the rear in the direction of travel of the road paver, and, in particular, fit closely to this area. Therefore, the step surface is arranged in a particularly space-saving manner in the transport position.

During tilting from the transport position to the operating position, the step surface can be tilted by a tilting angle of approximately 90°.

The tiltability of the step part can be ensured by the step part being tiltably fastened on a bolt that is firmly linked to the support part. Alternatively, a bolt that is firmly linked to the step part can, for example, be rotatably supported in the support part. In particular, a tilting plate solidly linked to the step surface can be firmly connected to the bolt or be designed for supportingly receiving the bolt.

The engagement of the engagement element with the step part can be ensured by a contact between a locking engagement surface of the engagement element and a step part engagement surface of the step part. The contact can thereby block a tilting movement of the step part from the operating position. In the engagement state, the locking engagement surface and the step part engagement surface can be aligned in parallel to each other.

The step part, especially its tilting plate, can have a curved surface and a recess next to it, especially alongside the outer circumference of the tilting plate in cases where the tilting plate is provided. Through the pre-load of the engagement element, the engagement element can be in grinding contact with the curved surface during a tilting process of the step part from the transport position to the operating position. As soon as the operating position is reached, the engagement element can, due to the pre-load, be moved at least partially into the recess adjacent to the curved surface to ensure the engagement.

An embodiment in which the engagement element is tiltably attached to the support part is regarded as particularly advantageous. In particular, the engagement element can be attached to a securing axis of the locking unit that is supported at the support part in a tiltable way. The securing axis can be a rod-shaped element. The securing axis is preferably parallel to the main tilting axis.

The pre-load of the engagement element for the movement towards the engagement with the step part can be ensured in a particularly easy way by means of a spring that biases the engagement element for the movement towards the engagement with the step part.

In embodiments with the tiltable engagement element, a torsion spring, which biases the securing axis to an appropriate rotation, can be used for this purpose. Through the use of a spring, the strength of the pre-load of the engagement element can be determined by a suitable choice of the spring.

As an alternative to the use of a spring or in addition to the spring, at least one eccentric weight can be provided at the securing axis. Through this eccentric weight, the securing axis can be pre-loaded for a rotation. The engagement element installed at the securing axis can be pre-loaded by the weight force of the eccentric weight for the movement, in particular a rotation, into the engagement with the step part. The eccentric weight can be installed on a side of the securing axis that faces the step part. Preferably, the eccentric weight and the securing axis are provided as one piece.

To be able to tilt the step part from the operating position to the transport position, the engagement element must be removed from the engagement with the step part against the pre-load. This can be done in different ways, depending on the design of the locking unit. For example, a handle can be installed at the securing axis to enable a user to remove the engagement element from engagement against the pre-load, in particular by means of rotating the securing axis. By providing the above described at least one eccentric weight in a suitable shape, the eccentric weight can also be used as a handle so that separately providing a handle becomes superfluous.

According to a preferred embodiment, a stopper is provided at the support part, which limits a rotation of the securing axis contrary to the pre-load direction by engagement with the engagement element. In particular, the stopper can be positioned in a way as to prevent that the at least one eccentric weight is rotated by a rotating movement of the securing axis as far as to face away from the step part or as far as to stand in an exactly vertical position and that therefore the torque, that is applied to the securing axis by means of the at least one eccentric weight, changes its direction.

The disclosure also concerns a road paver with a control station according to the embodiments described above. Thereby, the control station can be positioned at the rear end of the road paver in the direction of travel and the support part can be firmly linked to the chassis or the paving screed, in particular by means of a screwed or welded joint.

Embodiments according to the present disclosure are described below in greater detail with reference to the attached drawings.

DETAILED DESCRIPTION

As required, detailed embodiments are disclosed herein; however, it is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
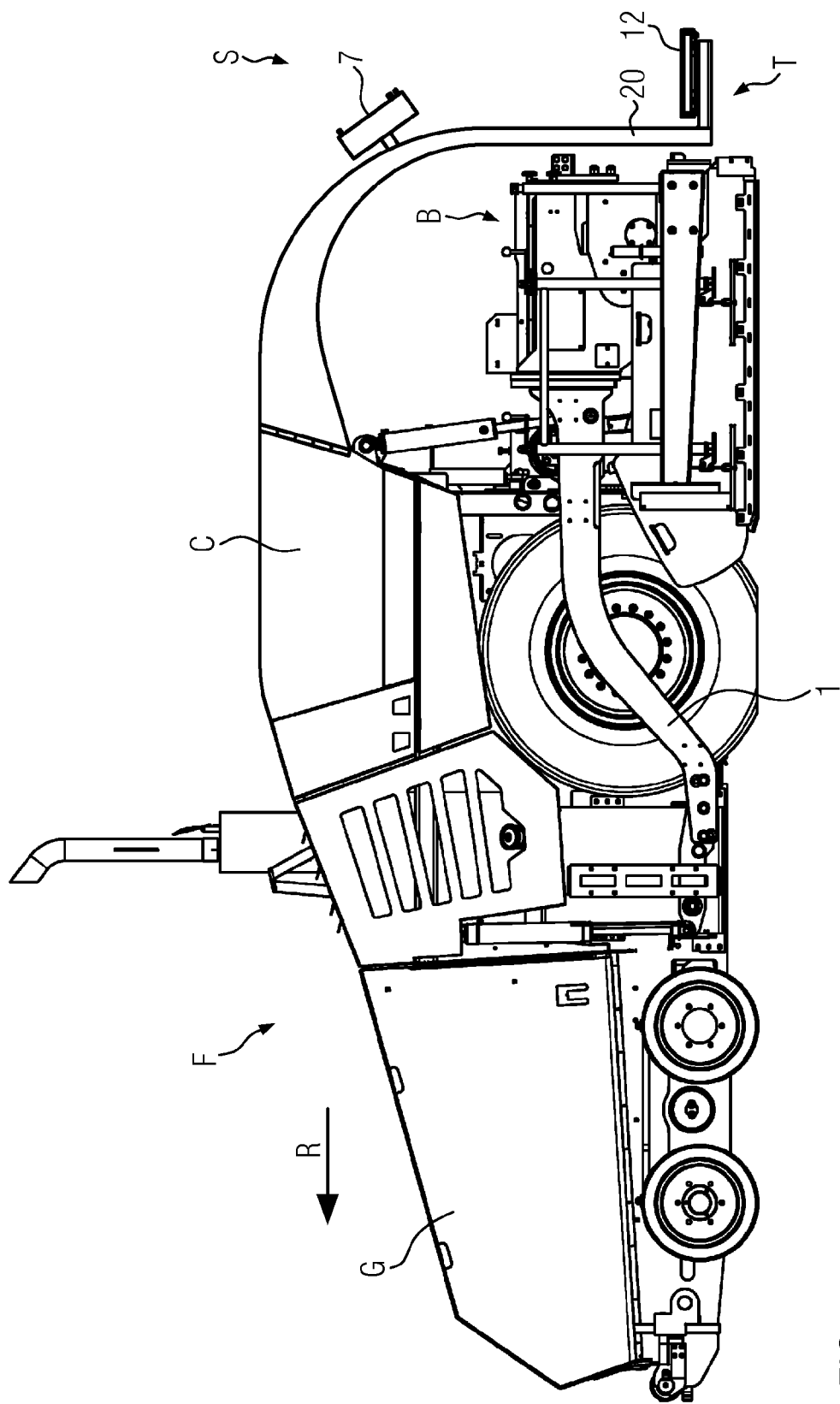
FIG. 1 is a schematic display of a road paver with a control station according to the disclosure that has a step device to provide a standing area for a person, wherein the support part is attached to the chassis of the road paver.
Figure 2:
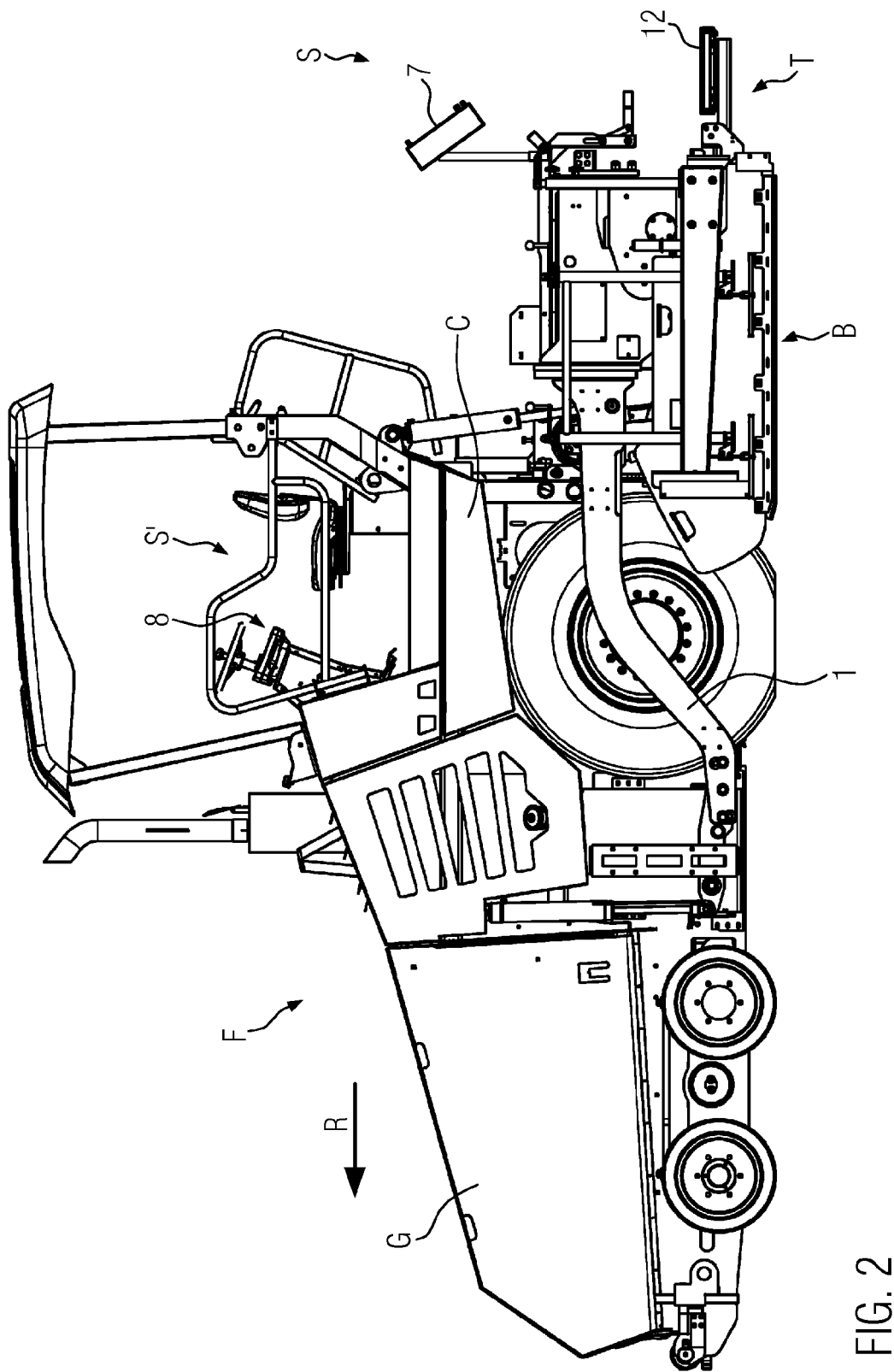
FIG. 2 is a schematic display of a road paver with a control station according to the disclosure, wherein the support part is attached to the paving screed of the road paver.

FIGS. 1 and 2 show a paving screed B of a road paver F that is dragged on lateral traction bars 1. Paving material provided in the material hopper G of the road paver F, for example bituminous paving material, is placed in front of the paving screed B with respect to the working direction R, is subsequently spread in a transversal direction on the road surface by a spreading auger that is not shown and is compressed and straightened by the paving screed B.

FIG. 1 shows a control station D installed at the chassis C of the road paver F. The control station D comprises the tiltable step device T with a step surface 12 that provides the standing area for an operating person. In the preferred embodiment shown in FIG. 1, the control station D also comprises at least one control element 7 with adjustment units for controlling the functions of the road paver F and/or the paving screed B. No additional control station is provided at the road paver F of FIG. 1 so that all functions of the road paver F can be controlled via the at least one control element 7. This is particularly advantageous for small road pavers F.

FIG. 2 shows a road paver F in which the control station D according to the disclosure is linked to the paving screed B. In the displayed embodiment, the control station D is designed as a side control station. This means that, in addition to the control station D with the at least one control element 7, a further control station D' as a main control station with further control elements 8 is provided, here on a control platform of the road paver F.

Figure 3:
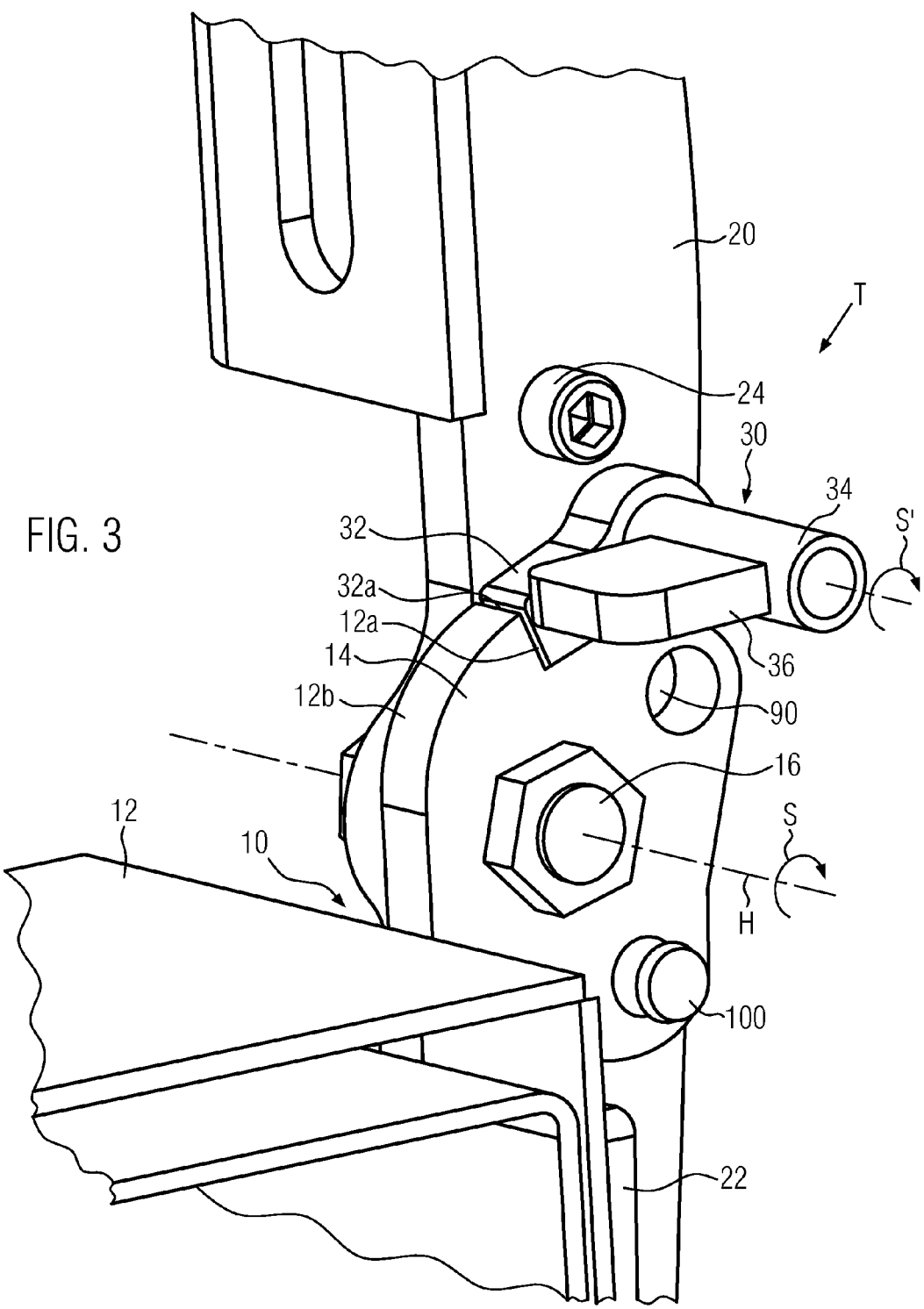
FIG. 3 is a schematic perspective view of a section of a step device of a control station according to the disclosure in the operating position.
Figure 4:
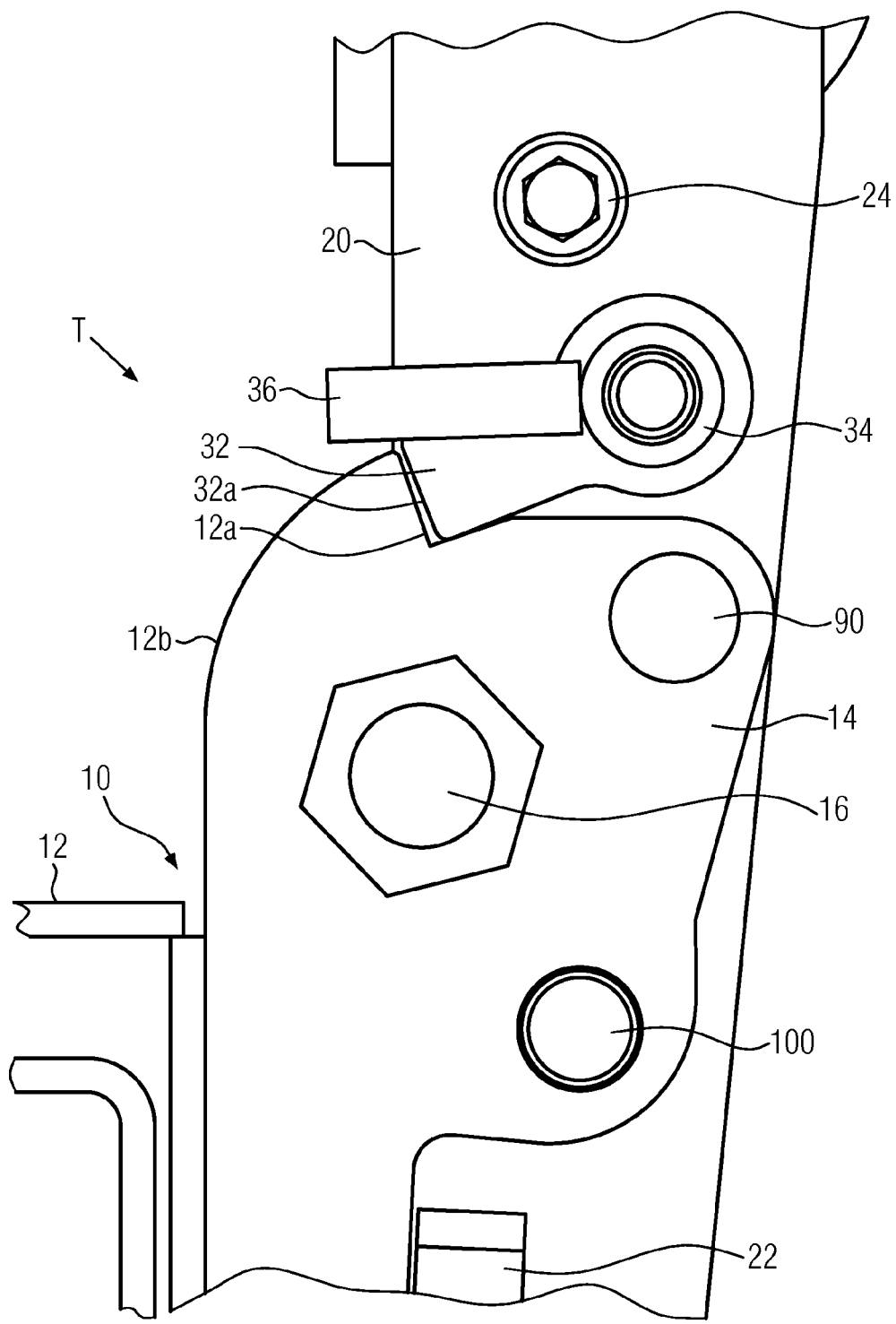
FIG. 4 is a schematic side view of a section of a step device of a control station according to the disclosure in the operating position.

FIGS. 3 and 4 illustrate the step device T of a control station D according to the disclosure with the support part 20 that is adapted to be firmly linked to the chassis C or the paving screed B of the road paver P. The support part 20 in the presently shown embodiment is a vertically extending bar.

A step part 10 of the step device T comprises a step surface 12 that is aligned horizontally in FIGS. 3 and 4 and a tilting plate 14 that is firmly connected to it. The step area 12 can comprise a metal sheet or be formed by a metal sheet.

Providing the tilting plate 14 is preferred but not absolutely necessary as the tiltability of the step part 10 can also be ensured in a different way. The tilting plate 14 is connected to the support part 20 via a bolt 16 and can be tilted about the main tilting axis H. The main tilting axis H thereby preferably extends in a horizontal plane and vertically to the paving direction R. Through tilting about the main tilting axis H towards the paving screed B (in the tilting direction S), the step part 10 can be brought in a vertical transport position. In an embodiment without a tilting plate 14, the bolt 16 could be connected directly to the step surface 12 and/or be tiltably attached to it.

A limit stop 22 provided at the support part 20, preferably below the main tilting axis H or the tilting plate 14, prevents, through contact with the step part 10, tilting of the step surface 12 contrary to the tilting direction S beyond the horizontal position in a downward direction.

The step part 10 is kept in the operating position shown in the FIGS. 3 and 4 by means of a locking unit 30. For that, the locking unit 30 has an engagement element 32 that prevents tilting of the step part 10 by its engagement with the step part 10, especially with the tilting plate 14 of the step part 10. Thereby, a locking engagement surface 32a of the engagement element 32 and a step part engagement surface 12a of the step part 10, especially of the tilting plate 14, are located opposite to each other such that a contact of these surfaces 12a, 32a blocks a tilting movement of the step part 10 in the tilting direction S out of the operating position.

The locking unit 30 shown in FIG. 3 has a securing axis 34 that is tiltably supported at the support part 20 (tilting direction S'). Preferably, the securing axis 34 is parallel to the main tilting axis H. In particular, the securing axis 34 extends in a horizontal plane and vertically to the paving direction R. The securing axis 34 can be designed as a rod or a pipe.

The engagement element 32 is preferably installed firmly at the securing axis 34. By a rotation of the securing axis 34, the engagement element 32 can therefore be brought in or out of the locking engagement with the step part 10 in the operating position of the step part 10.

An eccentric weight 36 is provided on the side of the securing axis 34 that faces away from the paving screed B and towards the step part 10. Through its weight force, the securing axis 34 is pre-loaded contrary to the tilting direction S'.

Hence, the engagement element 32 is pre-loaded for a movement into engagement with the step part 10, especially with the tilting plate 14. Pre-loading is consequently ensured by gravity, wherein alternatively or in addition, e.g., pre-loading by a tension of a spring would be conceivable. When the operating position is reached, the engagement element 32 automatically moves into the securing engagement with the step part 10 shown in FIGS. 3 and 4 due to its pre-load.

If the step part 10 should be tilted from the operating position shown in FIGS. 3 and 4 about the main tilting axis H in the tilting direction S to the transport position, the engagement element 32 can be rotated out of the engagement through a rotation, especially a manual rotation, of the securing axis 34 in the tilting direction S' against to the pre-load. By that, the tilting movement of the step part 10 in the tilting direction S of the main tilting axis H is released.

If the eccentric weight 36 has an appropriate form, it can be used by an operator as a handle to rotate the securing axis 34 to release the step part 10. As shown in FIG. 3, the eccentric weight 36 can therefore be provided as a plate that protrudes from the securing axis 34. Alternatively, providing the eccentric weight 36 as a bar or bulge or in any other appropriate shape is conceivable. Of course, there can also be several eccentric weights 36 on the securing axis 34.

As can easily be seen in light of FIGS. 3 and 4, the direction of the pre-load of the securing axis 34 by the eccentric weight would reverse if the eccentric weight 36 was tilted beyond a vertical position in the tilting direction S'. To prevent this, at the support part 20, a stopper 24 is provided that limits the movement of the engagement element 32 in the tilting direction S' beyond a defined position. This position is chosen such that the center of gravity of the eccentric weight 36 cannot be tilted in the tilting direction S' as far as to lie above the securing axis 34.

It becomes clear that the support part 20 shown in the Figures is located preferably at an outer region of the chassis C or the paving screed B (e.g., with respect to the paving direction R on the left in FIG. 1 or 2). Of course, the step part 10 can be attached tiltably about the main tilting axis H at a second support part 20 on the opposite side of the control station D with respect to a transversal direction in the same or a similar manner. Preferably, the securing axis 34 is rotatably supported at the opposite side in a second support part. Also, a second engagement element as well as a second tilting plate can be provided in an analogous way. However, this is not necessarily the case.

FIG. 4 is a side view of the device according to the disclosure in the operating position shown in FIG. 3, wherein we look at it along the main tilting axis H. This illustration shows the generally horizontal position of the step surface 12 in the operating position as well as the generally vertical alignment of the support part 20. However, a non-vertical alignment of the support part 20 would also be possible.

Figure 5:
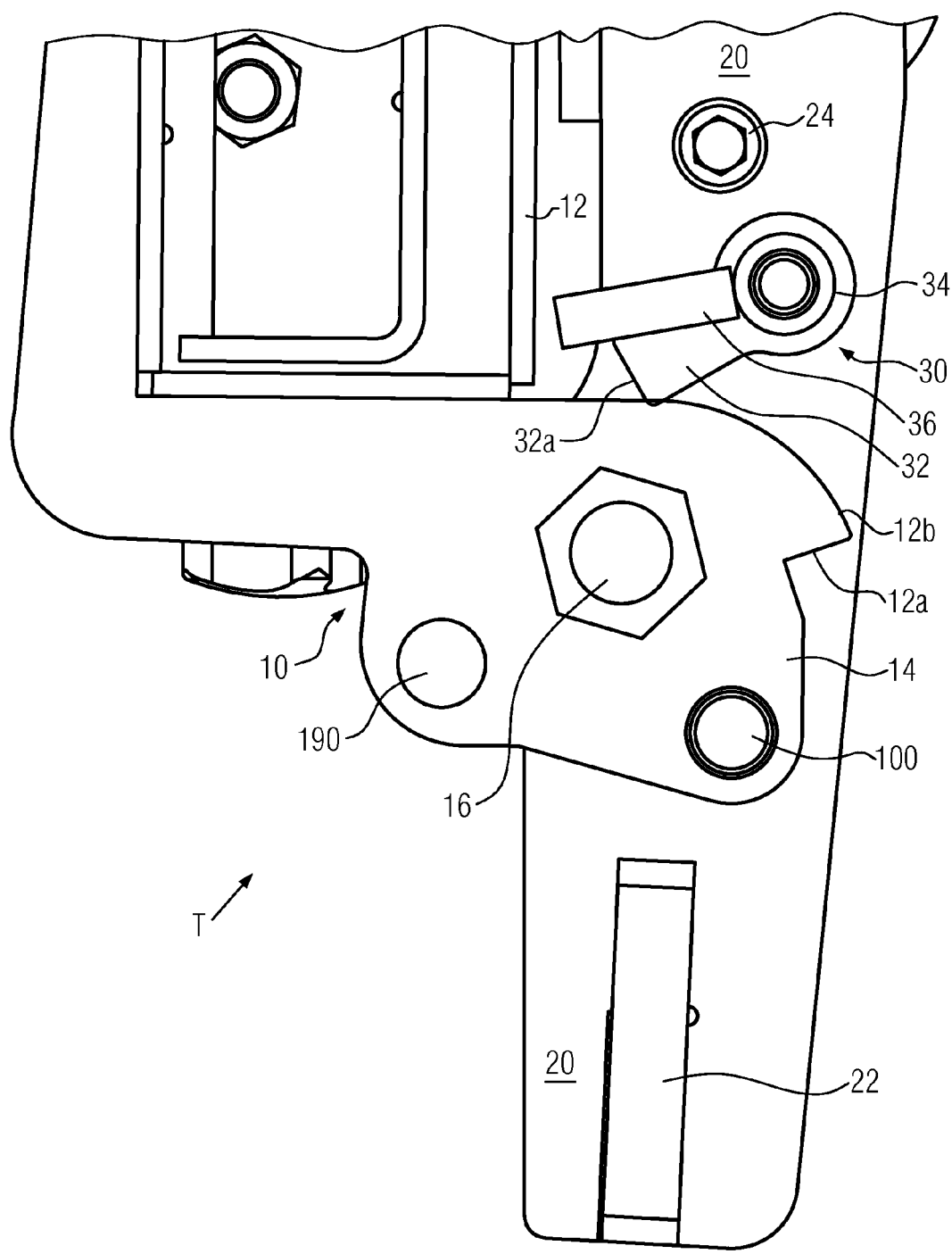
FIG. 5 is a schematic side view of a section of a step device of a control station ac-cording to the disclosure in the transport position.

The schematic side view of FIG. 5 shows the step part 10 of the control station D ac-cording to the disclosure in the transport position. In the displayed embodiment, the step surface 12 is aligned vertically in the transport position. In the transport position, the engagement element 32 is not in the secure engagement with the step part 10.

Nevertheless, the engagement element 32 of the locking system 30 is pre-loaded also in this position for a movement into the engagement with the step part 10, in the shown embodiment through the weight force of the eccentric weight 36.

The step part 10, in particular its optionally provided tilting plate 14, preferably has a curved surface 12b and a recess adjacent to it. The pre-load through the eccentric weight 36 brings the engagement element 32 in contact with the curved surface 12b of the step part 10. This contact is ensured both in the transport position as well as in the transitory positions during tilting of the step part 10 between the transport position and the operating position.

As can be easily understood from FIG. 5, the engagement element 32 is in grinding con-tact with the curved surface 12b when the step part 10 is tilted from the transport position to the operating position. When the operating position is reached, the engagement element 32 is moved by the pre-load into the recess of the tilting plate 14 that is adjacent to the curved surface 12b. Thereby, the position with the securing engagement as shown in FIGS. 3 and 4 is reached.

To secure the step part 10 in the transport position as well, different ways are possible. On one hand, a second engagement element can be installed that engages with the step part 10 in the transport position. Also here, a pre-loading of the respective engagement element for a movement into engagement with the step part 10 would be possible. Such a second engagement element could engage at a different point of the tilt plate 14 than the first first engagement element 32 and could be installed, for example, on the support part 20 below the tilting plate 14 and be pre-loaded and/or biased with a spring.

As it is less likely that a securization of the step part 10 will be forgotten in the transport position, it is not necessarily required that this securization also occurs in an automated way. Hence, also a manual securing system can be used in this process. As shown in FIGS. 3 and 4, the tilt plate 12 of the step part 10 has an aperture 90. There is a respective complementary aperture in the support part 20, arranged in a way that the two apertures 90 are lying on top of each other in the transport position. When a bolt 100 is led through the aperture 90 in the tilting plate 14 and the complementary aperture in the support part 20, the step part 10 can be secured against tilting out of the transport position. The bolt 100 used for this purpose preferably has a bent section that can be used as a grip and that prevents slipping of the bolt 100 through the two apertures 90. On the side of the apertures 90 that is located opposite to the bent part, the bolt 100 can be secured with a splint.

FIGS. 3 to 5 further show a second aperture 190 in the tilting plate 14. In the operating position, it is arranged on top of the complementary aperture of the support part 20. As shown in FIGS. 3 and 4, the step part 10 can therefore additionally also be secured manually in the operating position. However, this is not necessary as the step part 10 will already be secured automatically by the pre-load of the engagement element 32 for the movement into the engagement with the step part 10 when the step part 10 reaches the operating position.

The time-consuming and error-prone manual securing process with a bolt 100 can consequently be eliminated in a control station D according to the disclosure.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A control station for a road paver with a step device for providing a standing area for a person, the control station comprising:

a support part that is adapted to be firmly linked to a chassis or a paving screed of the road paver;

a step part with a step surface, the step part being attached to the support part and tiltable about a main tilt axis between a transport position and an operating position, wherein the step surface is aligned generally horizontally in the operating position so that the standing area for the person is provided; and a locking unit with an engagement element that is configured to come into engagement with the step part when the step part is in the operating position, the engagement securing the position of the step part, wherein the engagement element of the locking unit is pre-loaded for a movement into the engagement with the step part.

2. The control station according to claim 1 wherein the engagement element is configured to automatically come into the engagement with the step part through the pre-load when the step part reaches the operating position.

3. The control station according to claim 1 wherein the locking unit is attached at the support part.

4. The control station according to claim 1 wherein the step surface is aligned generally vertically in the transport position.

5. The control station according to claim 1 wherein the engagement element has a locking engagement surface and the step part has a step part engagement surface, and wherein during engagement, the locking engagement surface is configured to contact the step part engagement surface to block a tilting movement of the step part out of the operating position.

6. The control station according to claim 1 wherein the step part has a curved surface and a recess adjacent to the curved surface, and wherein the pre-load of the engagement element of the locking unit is configured such that the engagement element is in grinding contact with the curved surface during a tilting movement of the step part from the transport position to the operating position and such that the engagement element is at least partially moved into the recess when the operating position is reached.

7. The control station according to claim 1 further comprising a spring that pre-loads the engagement element for the movement into the engagement with the step part.

8. The control station according to claim 1 wherein the engagement element is attached at a securing axis of the locking unit that is tiltably attached to the support part.

9. The control station according to claim 8 wherein the securing axis is situated in parallel to the main tilt axis.

10. The control station according to claim 8 wherein at least one eccentric weight is provided at the securing axis, wherein the engagement element is pre-loaded by the weight force of the at least one eccentric weight for the movement into the engagement with the step part.

11. The control station according to claim 9 wherein at least one eccentric weight is provided at the securing axis, wherein the engagement element is pre-loaded by the weight force of the at least one eccentric weight for the movement into the engagement with the step part.

12. The control station according to claim 10 wherein the at least one eccentric weight is designed as a handle that enables a user to tilt the securing axis so that the engagement element can be removed from the engagement against the pre-load.

13. The control station according to claim 11 wherein the at least one eccentric weight is designed as a handle that enables a user to tilt the securing axis so that the engagement element can be removed from the engagement against the pre-load.

14. The control station according to claim 8 further comprising a stopper installed at the support part, wherein the stopper limits a rotation of the securing axis against the pre-load direction through an engagement with the engagement element.

15. The control station according to claim 9 further comprising a stopper installed at the support part, wherein the stopper limits a rotation of the securing axis against the pre-load direction through an engagement with the engagement element.

16. The control station according to claim 10 further comprising a stopper installed at the support part, wherein the stopper limits a rotation of the securing axis against the pre-load direction through an engagement with the engagement element.

17. The control station according to claim 12 further comprising a stopper installed at the support part, wherein the stopper limits a rotation of the securing axis against the pre-load direction through an engagement with the engagement element.

18. A road paver comprising:
a chassis;
a paving screed; and
a control station according to claim 1 installed at a rear portion of the road paver with respect to a direction of travel, wherein the support part is firmly linked to the chassis or the paving screed.

19. The road paver according to claim 18 wherein the engagement element of the control station is configured to automatically come into the engagement with the step part through the pre-load when the step part reaches the operating position.

20. The road paver according to claim 18 wherein the locking unit of the control station is attached at the support part.

* * * * *